May 7, 1968  H. ROSENBERG ET AL  3,381,590
HYDRAULIC ACTUATOR FOR LONGWALL MINING CONVEYOR
ADVANCING APPARATUS

Filed Aug. 2, 1966  3 Sheets-Sheet 1

INVENTORS:
HARRY ROSENBERG
KARL-HEINZ PLESTER
BY
*Burgess, Dinklage & Sprung*
ATTORNEYS United States Patent Office 3,381,590
Patented May 7, 1968

3,381,590
HYDRAULIC ACTUATOR FOR LONG-
WALL MINING CONVEYOR ADVANC-
ING APPARATUS
Harry Rosenberg, Ludinghausen, and Karl-Heinz Plester, Wethmar, near Lunen, Germany, assignors to Gewerkschaft Eisenhutte Westfalia, Wethmar, near Lunen, Westphalia, Germany
Filed Aug. 2, 1966, Ser. No. 569,711
Claims priority, application Germany, Aug. 5, 1965, G 44,363
5 Claims. (Cl. 92—140)

ABSTRACT OF THE DISCLOSURE

This specification discloses a novel hydraulic actuator device of the piston and cylinder type. In this device, the piston has a piston rod associated therewith, and there are provided a hydraulic fluid supply conduit or passage and a hydraulic fluid return conduit or passage therein. One of the conduits or passages communicates with one face of the piston, and the other conduit communicates with the opposite face of the piston. The remote ends of these conduits communicate with a surface of the piston rod which is external of the cylinder and is intermediate the ends of the piston rod. This communicating surface of the piston rod is flattened and has mounted therein hydraulic coupling means which is correspondingly flattened at the mating surface thereof. There is suitably provided a sealing ring means between the valve base plate and the piston rod surface so as to provide a fluid pipe connection therebetween. The valve means has conduits corresponding to the piston rod conduits and is connected to an external source of hydraulic fluid. The non-enclosed end of the piston rod suitably has coupling means thereon for attachment to a device being actuated by the hydraulic fluid actuator hereof. In the operation of this device, hydraulic fluid may be provided to either face of the piston and returned from the area proximate to the other face of the piston, thus providing for movement of the piston in both directions as desired.

---

This invention relates in general to hydraulically operated longwall conveyor advancing equipment commonly used in the mining of coal and other minerals. More particularly, the invention pertains to a hydraulic fluid supply and return arrangement for a piston and cylinder type conveyor advancing actuator.

The invention provides a hydraulic fluid supply and return arrangement in which hydraulic fluid is supplied into the cylinder and returned therefrom through passages extending within the piston rod which are so arranged as to provide a piston rod outer end portion which can be mechanically connected to transfer piston load forces without any interference with the parts and lines associated with the hydraulic fluid supply and return system.

In general, various types of conveyor advancing apparatus are known wherein hydraulically operated piston and cylinder actuators are utilized to effect advancement of longwall conveyor sections. Some of these advancing actuators feature hydraulic supply and return arrangements wherein the hydraulic fluid is fed to the front and rear faces of the piston through passages created in the piston rod. Advancing actuators are also commonly used in mining, in which the piston rod consists of a plurality of assembled parts such as in the case where the piston rod head is welded onto the rest of the rod body and/or in which the inlet and outlet passages for hydraulic fluid are defined by tubes screwed or welded into the piston rod.

With this type of construction, the multiplicity of connecting joints results in a relatively high labor cost for manufacturing such actuators, and particularly in the case where welded joints are used, breakage and leaking problems frequently arise during actuator operation. There is the difficulty in cases where hydaulic fluid carrying tubes are welded into the piston rod that if these joints should develop leaks afterwards, they are no longer accessible for repair. If the hydraulic fluid is introduced into the area of the piston rod head, i.e. in the region of its outward end portion, the piston rod head is somewhat weakened by the reduction in available material cross section area by reason of the hydraulic fluid passages running therethrough. Ordinarily, the piston rod head is of particularly heavy construction to withstand the load forces commonly used for conveyor advancing, and to compensate for load bearing material which must necessarily be removed by machining to accommodate the installation of fastening members which secure load coupling members to the piston rod. A typical load coupling member used has a collar portion which is received on the rod end portion and is connected thereto by a pin which passes through an aperture in the collar and a passage created transversely through the piston rod. This particular coupling element also has a forked yoke portion that extends outwardly beyond the end of the piston rod and is arranged for connection to an external load force receiving means.

Whether a separate forked coupling member be attached to the piston rod head, or the piston rod head be integrally constructed with a forked coupling, there nevertheless must be sufficient room provided on and around the head end of the piston rod to allow a sturdy coupling member capable of transmitting the forces exerted by the piston. In addition, for practical reasons, the elements which define the hydraulic supply and return system, and the hydraulic lines which connect such system to external hydraulic supply and return means must be so arranged as not to interfere with the fork or other member which establishes mechanical coupling between the piston rod and the means acted upon by the piston rod. Where the supply and return hydraulic flows are to be locally controlled, it is furthermore necessary that such control means be capable of operation to regulate the supply and return flows of hydraulic fluid independently of piston rod extension and without interference from or with any mechanical coupling means connected to the piston rod.

In certain prior art designs wherein the hydraulic fluid is introduced into the piston rod head, there is also the disadvantage that with a rod head of fork-like construction, adaptation to horizontally pivoting supporting members of a following coupled element is made difficult.

If an intermediate coupling piece suitable for connection with horizontally or vertically pivoting connecting member is used to transfer the piston load to a receiving means, it is practically impossible to prevent the development of two articulation movements, one pivoting horizontally and the other pivoting vertically. This is extremely unfavorable to the transmission of power, so that in practice, for advancing actuators with forked piston rod heads, intermediate pieces which differ according to whether they are to be connected to horizontally or vertically pivoting members are used as load transfer pieces, unless it is permissible to allow the fittings for hydraulic fluid lines to be set at a 90° angle to the mine floor.

Another disadvantage of certain prior art advancing actuators lies in the fact that, if a control valve locally mounted on the head of the piston rod is not used, the hydraulic fluid connections cannot be mounted directly on the piston rod head as would be advantageous for remote control operation, because the allowable passage entrance holes do not permit such an arrangement. It therefore becomes necessary to provide transition coupling pieces in order to connect the hydraulic supply and return lines for communication with the piston rod passages.

It is thus a purpose of the invention to provide for more efficient use of such advancing actuators in the case of remote control, for the avoidance of weak points, weld seams and screw fastenings which lead to losses of hydraulic fluid through leakage, and to achieve a piston rod head design, which, while using a standard type mechanical coupling piece, permits only one vertically or horizontallly pivoting articulation independently of whether vertically or horizontally pivoting members are connected to such coupling piece. At the same time, the invention assures that the control valve, or the hydraulic line connections in the case of remote control, are always on the top portion of the piston rod and are not turned downward due to any canting of the piston rod.

The invention achieves this purpose in a longwall conveyor advancing actuator of the piston and cylinder type wherein the piston rod head bears the connections for the hydraulic fluid by reason of the fact that the piston rod, which is of solid cross section and provided with bores or passages for the infeed and return of hydraulic fluid, has on the piston rod head a cross section that does not exceed in area any other cross sections of the piston rod, and has a hydraulic coupling-control means which is fastened in a pressure-tight manner to the piston rod in the area of the infeed and return holes by a suitable clamping means, such as for example shackles or the like, making use of a flattened exterior surface portion on the piston rod to establish the proper clamping location of the coupling.

With the actuator construction made possible by the invention, the entire piston rod can be economically manufactured out of a single solid piece, since the piston rod head need not be made any thicker or different in cross section than other portions of the piston rod, and because the need for any welding is eliminated.

The invention provides in an advancing actuator, a hydraulic fluid supply and return arrangement wherein the hydraulic supply and return lines can be either coupled directly to associated passages created within the piston rod itself, or can be coupled to a control valve which is series coupled to such passages. This is achieved by machining internal fittings into the entrance portions of the piston rod passages, so that either hydraulic hose connections or similar valve coupling connections can be made quickly and easily.

According to another feature of the invention, the control valve can be affixed in a groove provided in the piston rod by means of centering coupler pins which are equipped individually with a longitudinal bore and are screwed into the inlet and return passages. The bores of these coupling conduit members are made the same in diameter as the internal diameters of the conventional high-pressure hydraulic hoses which are used to supply and return hydraulic fluid from the cylinder. This assures that the same fluid flow area is available through the piston rod as is provided by the hoses which connect to the external hydraulic fluid supply and return means. When a hydraulic coupling mounted on the piston rod head is used, these coupling conduits function as centering pins to aid in the installation of the coupling, whereas when remote control operation of the actuator is provided, these centering conduits can be replaced with common high-pressure hose fittings. According to the invention, the use of intermediate coupling pieces for making the hydraulic connections between the supply and return hoses and piston rod passages, or between a control means and said piston rod passages is thereby avoided. Furthermore, the connection between the piston rod head and the hydraulic coupling mounted thereon as provided by the invention is of smaller and lighter construction.

The hydraulic coupling is preferably provided with a base plate which envelops the centering conduits with a certain clearance which is sealed against the piston rod by O-rings when the shackles or clamps which secure the coupling to the piston rod are drawn up tight to compress such O-rings between the coupling base plate and the mounting surface on the piston rod. This assures that hydraulic fluid transferred between the hydraulic coupling and the piston rod passages will not escape through any clearance openings such as might exist in the absence of these O-rings.

The piston rod head which bears the hydraulic fluid connections is preferably or circular cross sectional construction at its extremity and is provided with one or more transverse holes extending through its end portion which can be either intersectiong or non-intersecting holes. Such a circular cross section piston rod end portion is advantageous because it accommodates the attachment of a forked yoke type load transfer coupling which has a cylindrical collar that engages over the rod end portion and is secured thereto by a pin passing through the collar and a transverse rod hole. Just as the rod can be provided with one or more intersecting transverse holes, the collar of the load coupling can have more than one hole running athwart its longitudinal axis, so that a selection of more than one-yoke-piston rod connection angular orientation is available. If intersectiong holes are provided on one of the parts to be connected together and at least one transverse hole is provided on the other, the coupling piece can be adapted, as for example by a 90° rotation, to a connecting member that pivots horizontally or vertically on the conveyor to be advanced. The position of the piston, and hence the position of the hydraulic coupling in relation to the mine floor thus remains advantageously undisturbed by such a connecting arrangement. Also, a substantially rigid connection exists between the piston rod head and the coupling piece secured thereto.

Essentially, the hydraulic fluid supply and return arrangement of the instant invention can be considered as the combination of means defining a first pair of fluid flow passages extending longitudinally within the piston rod, and means defining a second pair of fluid flow passages extending transversely into the piston rod from respective locations on an exterior surface portion thereof disposed at predetermined distances behind the outward end of the piston rod. Each second pair passage communicates with a corresponding first pair passage, which in turn communicates with the interior of the cylinder at one of two opposite piston working face portions thereof. The second pair passages each open on the aforesaid piston rod surface portion and are disposed for alternate communication with an external hydraulic fluid supply means and a return means, either directly as by means of connected hoses, or indirectly through a hydraulic coupling mounted on the piston rod. Hydraulic fluid is fed into one cylinder portion through one set of communicating longitudinal and transverse rod passages and returned from the other cylinder portion through the other set of communicating rod passages to effect displacement of the piston and rod in a corresponding direction relative to the cylinder. To effect piston and rod displacement in the opposite direction, the supply and return hydraulic flows are merely channelled through respectively interchanged passage sets.

Where a hydraulic coupling secured to the piston rod is used to regulate the flow of hydraulic fluid supplied into and return from the cylinder, such is coupled to the hydraulic supply and return lines, and its fluid transfer ports are arranged for communication with corresponding transverse piston rod passages.

It is therefore, an object of the invention to provide a hydraulic fluid supply and return arrangement suitable for a hydraulic actuator to be used for advancing longwall mining conveyors.

Another object of the invention is to provide a hydraulic fluid supply and return arrangement as aforesaid in which the transfer of hydraulic fluid to and from the actuator cylinder occurs through internal passages created within the piston rod thereof.

A further object of the invention is to provide a hydraulic fluid supply and return arrangement as aforesaid wherein the hydraulic fluid passages in the piston rod are arranged to allow the mounting of a mechanical coupling element to the outward end of the piston rod without any interference between such mechanical coupling element and any element of the hydraulic fluid arrangement.

A further object of the invention is to provide a hydraulic fluid supply and return arrangement as aforesaid which allows the use of a substantially uniform diameter cylindrical piston rod through the use of an internal hydraulic passage arrangement therein which results in a minimum strength reduction at the outward end of the piston rod.

A further object of the invention is to provide a hydraulic fluid supply and return arrangement as aforesaid which is adapted for either remote control actuator operation or locally controlled actuator operation through a hydraulic coupling mounted on the piston rod.

A further object of the invention is to provide a hydraulic fluid supply and return arrangement as aforesaid wherein a hydraulic coupling is mounted on the piston rod in alignment with the entrances of the hydraulic flow passages therein to assure pressure-tight, leak proof hydraulic connections through such coupling to the piston rod passages.

Other and further objects and advantages of the invention will become apparent from the following detailed description and accompanying drawings in which.

Figure 1:
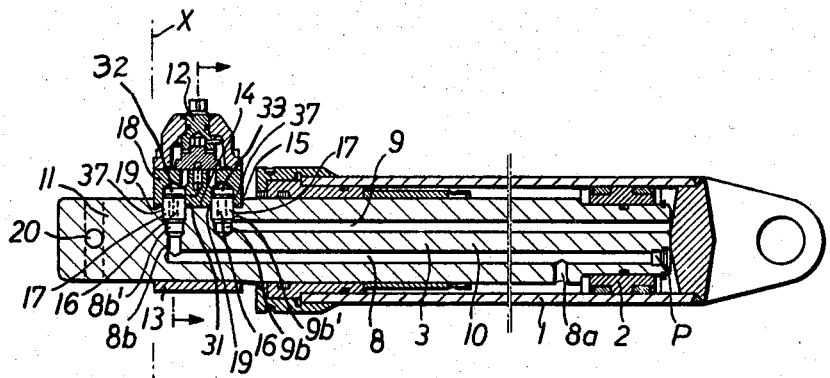
FIG. 1 is a longitudinal view, partly in section, of an advancing actuator featuring a hydraulic fluid supply and return arrangement according to a preferred embodiment of the invention.
Figure 3:
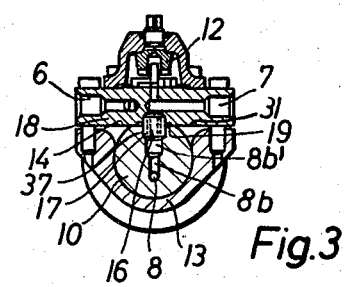
FIG. 3 is a transverse sectional view of the actuator shown in FIG. 1 taken along line A-B therein.
Figure 2:
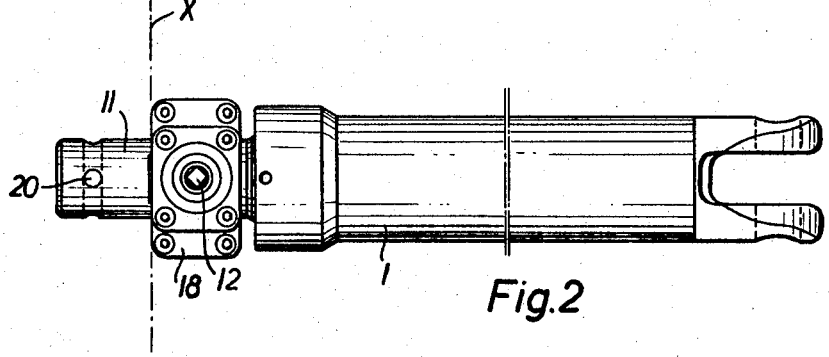
FIG. 2 is a plan view of the actuator shown in FIG. 1.

Referring now to FIGS. 1, 2 and 3, the conveyor advancing actuator 3 is hydraulically operated by regulating the admission and return of hydraulic fluid within its cylinder 1 on each side or working face of the piston 2 therein. As can be seen more readily from FIG. 1, the piston 2 is carried on the inner end of a piston rod 10 which, in this particular example, actually extends through the piston 2 and constitutes a portion of the inner (right side) working face thereof. The outward or head end 11 of piston rod 10 is ordinarily connected by a load transfer coupling element (see FIGS. 6 and 7) to a load force receiving means, such as a conveyor 4 which is to be advanced by hydraulic forces acting to extend the piston 2 and piston rod 10 outwardly with respect to the cylinder 1.

Preferably, the piston rod 10 is generally cylindrical and of substantially uniform diameter circular transverse cross section, and thus can be easily and economically machined from solid stock.

Since the actuator 3 as shown is provided with a double acting piston 2 such that to extend the piston rod 10 outwardly, pressurized hydraulic fluid must be fed into the right end of cylinder 1 and returned from the left end of cylinder 1, two passages 8 and 9 are machined longitudinally into the piston rod 10 from its inner end face. Prior to assembly of the actuator 3, both of these passages 8 and 9 are open at the inner face of rod 10, but because the passage 8 is to serve for transferring hydraulic fluid to and from the left compartment of cylinder 1, i.e. the fluid which acts against the left working face of piston 2, passage 8 is sealed off from the right compartment of cylinder 1 by means of a plug P. For this purpose, passage 8 communicates with another passage 8a which extends transversely into the rod 10 and is open at the exterior surface thereof. The rod 10 is of course, in this particular construction, of lesser diameter than the piston 2, thus creating the left fluid compartment in cylinder 1. To retract the rod 10, pressurized hydraulic fluid is fed into the left cylinder 1 compartment through passages 8 and 8a and returned from the right cylinder 1 compartment through passage 9. Consequently, each of the passages 8 and 9 is capable of serving as either a fluid supply or a return passage, depending upon in which direction the piston 2 and rod 10 are to be shifted.

Hydraulic fluid transfer from external supply and return means (not shown) takes place through transverse passages 8b and 9b which open at a flattened exterior surface portion 14 created on the rod 10, and respectively communicate with their associated longitudinal passages 8 and 9. Regulation of the supply and return flows of hydraulic fluid to the actuator 3 can be achieved either by a hydraulic coupling 12 mounted on the piston rod 10, as exemplified in FIGS. 1-3, or such flow regulation can be achieved by a remote control means (not shown). In the former case, i.e. local control, the coupling 12 is provided with fluid line connection fittings 6 and 7 which are adapted for coupling to similar mating fittings (not shown) provided on hydraulic base lines (not shown) respectively leading to an external hydraulic supply means (not shown) and an external hydraulic return means (not shown).

The hydraulic coupling 12 has a base plate 18 with a flattened mounting surface 31 to accommodate the securing of said valve 12 upon and against the rod surface portion 14, such as for example by clamping the valve base plate 18 with shackles 13. Such a coupling 12 mounting arrangement assures that the base plate 18 will be installed in a definite, predetermined angular attitude with respect to the longitudinal axis of the piston rod 10. Essentially, the coupling 12 is flow connected in series with the piston rod passages 8b 8, 8a and 9b, 9, and is provided with fluid transfer ports 32 and 33 which are respectively in flow communication with passages 8b and 9b. To prevent any possible shifting of the coupling 12 about an axis perpendicular to the rod mounting surface 14, said surface 14 is preferably created by machining a groove 15 equal in width to the base plate 18 across the upper portion of the rod 10.

Figure 6:
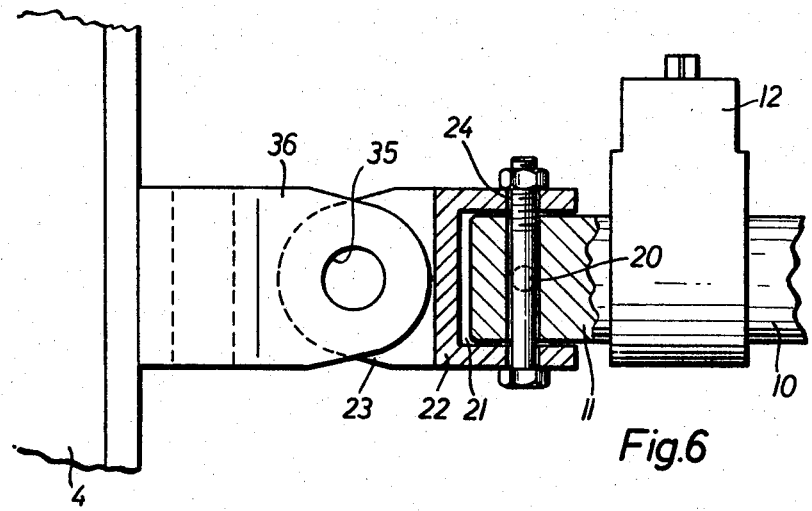
FIG. 6 is a schematic illustration, partly in section, of the outward end portion of the actuator of FIG. 1 illustrating a typical mechanical coupling arrangement between the piston rod and a conveyor to be advanced thereby.
Figure 7:
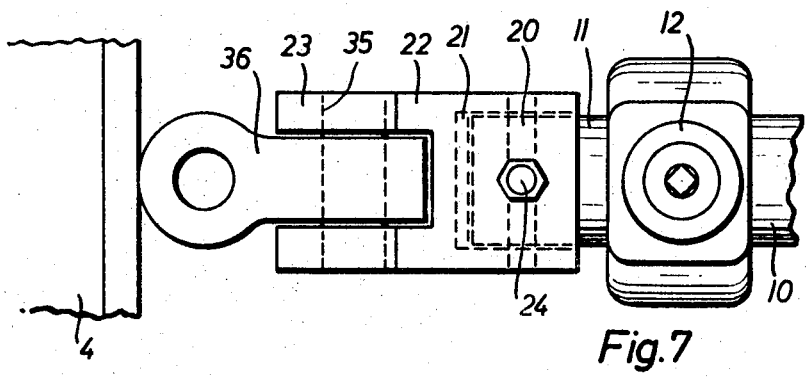
FIG. 7 is a schematic illustration of another mechanical coupling arrangement connecting the piston rod of the actuator shown in FIG. 1 to a conveyor to be advanced, as seen in a plan view.

By constructing the hydraulic fluid supply and return system associated with the actuation 3 in such a manner that the passages 8, 8b, 9, 9b, groove 15 and coupling 12 do not extend longitudinally any closer toward the outer end of the rod 10 than the limit plane X, an outward end portion 11 of suitable length can be reserved for the attachment of load transfer coupling element 22 as shown in FIGS. 6 and 7.

For connection to a load receiving means, such as a conveyor 4 which is to be advanced by the actuator 3, the piston rod end portion 11 is expediently circular in transverse cross section and provided with a transverse hole 20 or a pair of intersecting transverse holes 20. The hole or holes 20 facilitate the connection of the coupling element 22 by passing a pin or bolt 24 through similar holes provided on opposite portions of the coupling element 22 mounting collar 21 which is recessed internally with a cylindrical or other shape matching the shape of the rod end portion 11 upon which it is received. The coupling element 22 is provided with a forked yoke portion 23 extending outwardly beyond the end of the piston rod 10, said yoke portion 23 being provided with aligned bore passages 35 to adapt it for pivotal connection to a succeeding coupling element 36, 36′ which can be either directly mounted to the conveyor 4 to be shifted as coupling element 36, or can be an intermediate coupling element 36′.

Where two or more transverse rod holes 20 are provided, there is a choice available as to the angular orientation of the coupling element 22 with respect to the piston rod 10 and coupling 12. For example, as shown in FIGS. 6 and 7, the two intersecting rod holes 20 are mutually perpendicular and respectively aligned normally and parallel to the valve 12 mounting surface 14 on the piston rod 10. Simply by removing the bolt 24 through one hole 20, rotating the collar 21 until its holes line up with the other hole 20, and then replacing said bolt 24, the coupling element 22 can be secured to the rod end 11 with its yoke bore 35 axis either parallel or perpendicular to the coupling 12 mounting plane.

Figure 4:
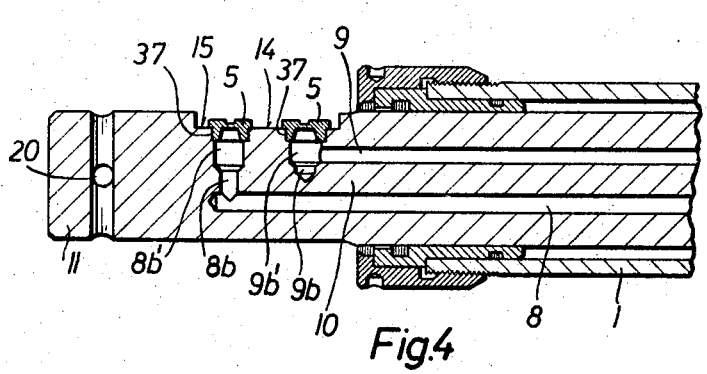
FIG. 4 is a partial longitudinal view, shown in section, of the advancing actuator of FIG. 1 with the hydraulic coupling removed.
Figure 5:
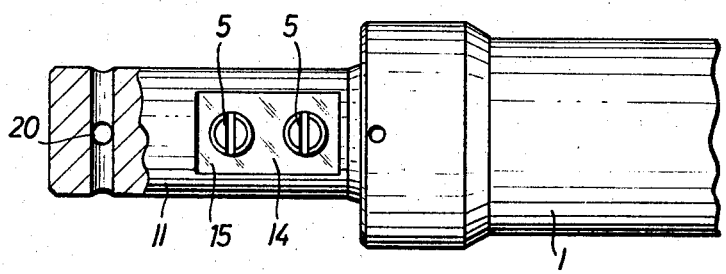
FIG. 5 is a plan view of the actuator portion shown in FIG. 4.

Preferably the entrance portions of passages 8b and 9b are provided with screw threads 37 or other types of internal fittings capable of receiving matching hydraulic base fittings (not shown) to accommodate the direct connection of hydraulic hoses to passages 8b and 9b. Such direct hose connections are of course made with the coupling 12 removed, as illustrated in FIGS. 4 and 5.

The passages 8b and 9b are made larger in diameter at their entrance portions, i.e. near the mounting surface 14 to allow the thread fittings 37 to be the same standard size as matches hydraulic hose fittings for hoses having the same internal diameter as the passages 8, 8a, 9.

It should be noted that preferably, the passages 8, 8a, 9, are made equal in diameter to the internal diameter of the hydraulic supply and return hoses, so that no reduction in available flow area results from using such internal piston rod passages.

To facilitate the installation of the coupling 12 using coupling conduit members 17 which functions as centering pins to aid in aligning the fluid transfer ports 32 and 33 of valve 12 with passages 8b and 9b, each passage 8b and 9b has a somewhat enlarged diameter section 8b′, 9b′ respectively extending below threads 37 to allow for the extension of the coupling conduit members 17. These conduit members 17 have bores 16 which are made equal in diameter to the internal hose diameter and hence the diametrical difference between sections 8b′, 9b′ and the remaining portion of passages 8b, 9b corresponds to the wall thickness of the coupling conduit members 17. The entrance portions of the valve transfer ports 32 and 33 are expediently enlarged to receive the conduit members 17 which are threaded to screw into the fittings 37.

When the coupling 12 is installed on the piston rod 10, its base plate 18 fits over the conduit members 17 and is sealed against the piston rod surface 14 by means of O-rings 19.

As can be appreciated from FIGS. 6 and 7, and FIGS. 1 and 2, by keeping the hydraulic passages 8, 8b, 9, 9b to the right of plane X, the outward end portion 11 of piston rod 10 is not subjected to any significant weakening by reason of material removal necessitated by these hydraulic passages, apart from the fact that suitable space is provided for receiving the collar 21 of coupling element 22. The only weakening of end portion 11 is that due to the pin connection holes 20, which in practice, for the piston rod 10 diameters used, is by no means critical, and if desired could be further reduced by using a threaded collar 21 and a threaded end portion 11.

The provision of the fittings 37 serves another useful purpose, namely that of protecting the piston rod passages from dirt, since when the coupling 12 is removed, the piston rod passages can be sealed by plastic plugs 5 screwed into the fittings 37 until the coupling 12 is installed or hydraulic hoses are connected to the fittings 37.

As will become apparent to the artisan from the foregoing description of the invention, the hydraulic fluid supply and return arrangement of the invention is susceptible of numerous obvious modifications and variations to suit the needs of a particular application. However, the invention is intended to be limited only by the following claims in which we have endeavored to claim all inherent novelty.

What is claimed is:

1. A piston and cylinder type hydraulic actuator, a hydraulic fluid supply and return arrangement which comprises a first pair of fluid flow passages extending longitudinally within the piston rod and disposed for communication with the interior of the cylinder of the piston to alternatively introduce hydraulic fluid into one piston face portion of the cylinder and return hydraulic fluid from the opposite piston face portion thereof to correspondingly displace the piston rod and the piston relatively to said cylinder; means defining a second pair of fluid flow passages extending transversely to said piston rod from respective opening locations on an exterior flattened surface portion thereof disposed at predetermined distances behind the outward end of the piston rod, each passage of said second pair being disposed for communication with an external hydraulic fluid supply means and an external hydraulic fluid return means to alternately introduce hydraulic fluid into one cylinder portion and return hydraulic fluid from the opposite portion through corresponding first pair passages; and further including a pair of internal fittings extending into said piston rod from said exterior surface portion thereof, which fittings are aligned with and disposed at the entrance portions of corresponding second pair piston rod passages, which fittings are adapted to accommodate the coupling of conduits for the supply and return of hydraulic fluid to and from said cylinder; and further including a hydraulic coupling having a base plate flattened to correspond to said surface portion and secured to said surface portion through a sealing ring means compressed between said plate and said surface, operative to selectively regulate the flow of hydraulic fluid to and from said cylinder, which coupling is disposed for coupling to said fittings through coupling conduit members and containing ports communicating with said fluid flow connection and said second pair of piston rod passages, whereby hydraulic fluid is adapted to flow into said cylinder and return from said cylinder through said coupling.

2. The hydraulic actuator according to claim 1 wherein said coupling, and said piston rod passages are located at predetermined axial distances behind the outward end of the piston rod to define a piston rod end portion unoccupied by hydraulic fluid supply and return elements and disposed for connection to a load transfer coupling element to transmit load forces exerted by the piston rod to an external load force receiving means.

3. The hydraulic actuator according to claim 2 wherein said piston rod end portion has at least one passage extending transversely therethrough in a predetermined attitude with respect to the flattened exterior surface portion of the piston rod to accommodate the connection of a load transfer coupling element received on said rod end portion by a pin passed through such load transfer element and a transverse rod passage.

4. The hydraulic actuator according to claim 3 including a load transfer coupling element having a collar portion received on said rod end portion and connected thereto by a pin passed through an aperture in said collar portion and a transverse rod passage, said coupling element having a forked yoke portion extending outwardly beyond the end of the piston rod and disposed for connection to an external load force receiving means, said yoke portion to establish a predetermined angular orientation between the yoke portion and the flattened exterior surface portion of the piston rod when said collar portion is pin connected thereto.

5. The hydraulic actuator according to claim 4 including a plurality of transverse passages extending through said piston rod end portion, each passage having a characteristic angular orientation with respect to said piston rod flattened exterior surface portion to accommodate the connection of said collar portion by a pin passed through any one of said transverse rod passages.

References Cited

UNITED STATES PATENTS

| 1,781,563 | 11/1930 | Walter | 92—140 |
| 1,909,179 | 5/1933 | Huffman | 92—111 |
| 2,193,497 | 3/1940 | Spire | 92—140 |
| 2,299,430 | 10/1942 | Sexton | 91—216 |
| 2,832,317 | 4/1958 | Henry | 91—216 |
| 2,906,248 | 9/1959 | Peras | 92—110 |
| 2,953,118 | 9/1960 | Flick et al. | 92—164 |

FOREIGN PATENTS

| 687,066 | 4/1930 | France. |

MARTIN P. SCHWADRON, *Primary Examiner.*

PAUL E. MASLOUSKY, *Examiner.*

UNITED STATES PATENT OFFICE
CERTIFICATE OF CORRECTION

Patent No. 3,381,590                                 May 7, 1968

Harry Rosenberg et al.

It is certified that error appears in the above identified patent and that said Letters Patent are hereby corrected as shown below:

In the heading to the printed specification, line 8, after "Germany" insert -- , a corporation of Germany --. Column 2, line 33, after "allow" insert -- for --. Column 4, line 12, "or" should read -- of --; line 25, "one-yoke-piston" should read -- one yoke-piston --; line 45, "predeterminted" should read -- predetermined --.

Signed and sealed this 25th day of November 1969.

(SEAL)
Attest:

Edward M. Fletcher, Jr.                           WILLIAM E. SCHUYLER, JR.
Attesting Officer                                         Commissioner of Patents